(12) United States Patent
Zank

(10) Patent No.: US 6,972,754 B2
(45) Date of Patent: Dec. 6, 2005

(54) TOUCHPAD STYLUS HAVING ISOLATED LOW-MASS CONTACT ELEMENT

(75) Inventor: Anthony E. Zank, Simi Valley, CA (US)

(73) Assignee: Topaz Systems, Inc., Simi Valley, CA (US)

( * ) Notice: Subject to any disclaimer, the term of this patent is extended or adjusted under 35 U.S.C. 154(b) by 424 days.

(21) Appl. No.: 10/186,323

(22) Filed: Jun. 27, 2002

(65) Prior Publication Data

US 2004/0001052 A1    Jan. 1, 2004

(51) Int. Cl.$^7$ ............................................. G09G 5/00
(52) U.S. Cl. ...................... 345/179; 345/156; 345/173; 178/18.01; 178/19.01
(58) Field of Search ................. 345/156–160, 345/165–166, 169, 173, 175, 177, 179–180, 345/182–183; 178/18.01–18.09, 19.01–20.01

(56) References Cited

U.S. PATENT DOCUMENTS

| | | | |
|---|---|---|---|
| 4,158,747 A | 6/1979 | Muller et al. | |
| 4,263,592 A | 4/1981 | Takahashi et al. | |
| 4,542,261 A | 9/1985 | Behnke | |
| 4,927,986 A | 5/1990 | Daly | |
| 5,115,401 A | 5/1992 | Oyama et al. | |
| 5,422,959 A | 6/1995 | Lee | |
| 5,571,997 A | 11/1996 | Gray et al. | |
| 5,705,741 A | 1/1998 | Eaton et al. | |
| 5,790,308 A | 8/1998 | Kamentsky | |
| 6,050,735 A * | 4/2000 | Hazzard | 401/33 |
| 6,252,182 B1 * | 6/2001 | Lai | 178/19.04 |

* cited by examiner

Primary Examiner—Bipin Shalwala
Assistant Examiner—Mansour M. Said
(74) Attorney, Agent, or Firm—Denton L. Anderson; Sheldon & Mak

(57) ABSTRACT

A touchpad stylus includes a housing, a stylus member axially moveable in the housing, and an energy-absorbing cushion member interposed between a rear extremity of the stylus member and an internal cavity of the housing, the cushion member lightly forwardly biasing the stylus member relative to the housing. The stylus member has a smoothly spherical tip extremity, and the device avoids impact damage to fragile outer membranes of existing touchpad devices because the full mass of the housing is isolated from impact with the touchpad, the stylus member itself having very significantly less mass than an aggregate mass of the complete assembly.

29 Claims, 2 Drawing Sheets

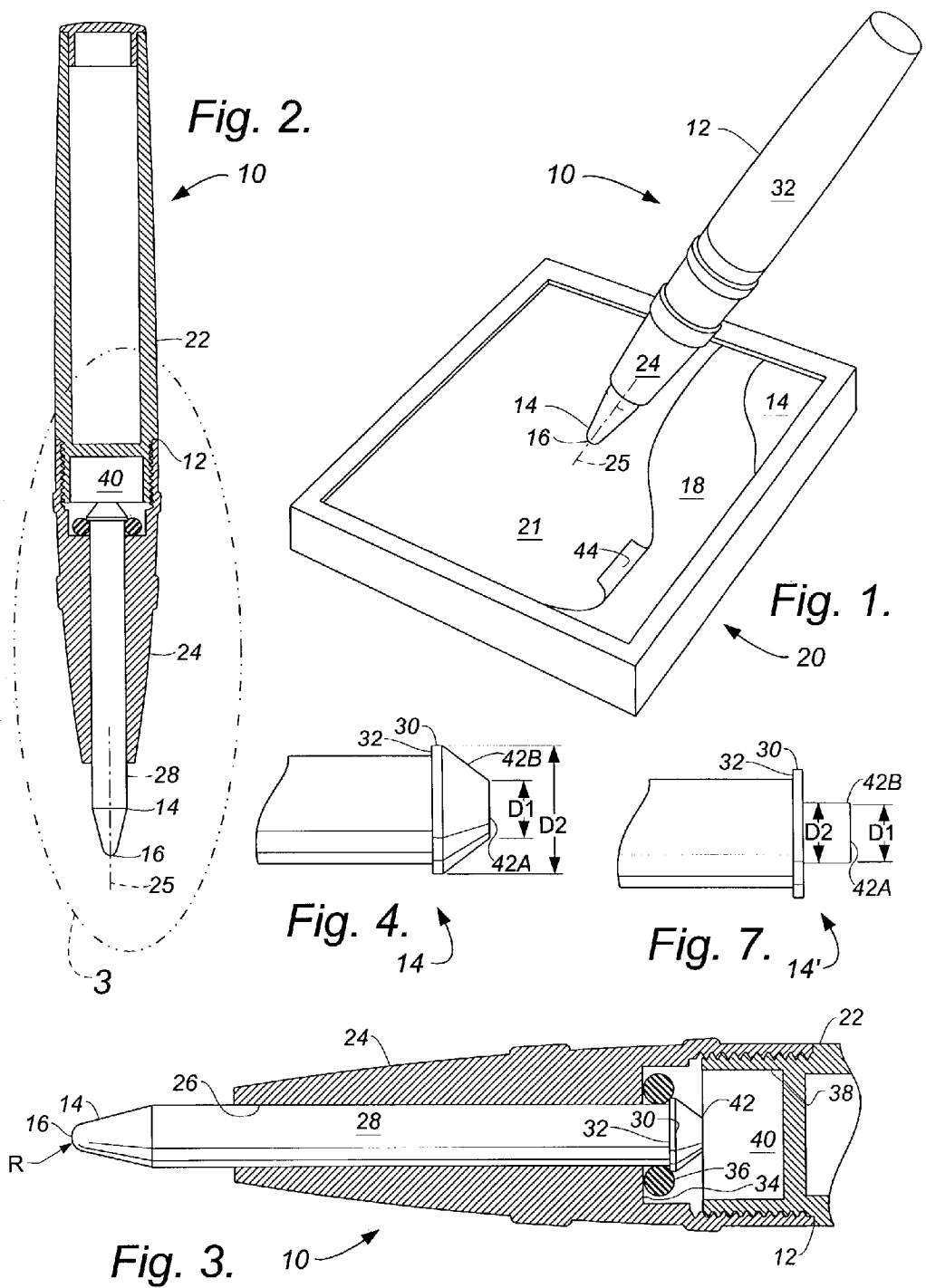

TOUCHPAD STYLUS HAVING ISOLATED LOW-MASS CONTACT ELEMENT

BACKGROUND

The present invention relates to electronic pointing devices and writing implements, and more particularly to styli for use with graphic tablets such as touchpads.

In the art of touchpads, it is conventional to provide a thin, flexible membrane as an outer member to be contacted by a stylus that is held by a user of the touchpad. A particularly vexing problem with this arrangement is that the flexible membrane, in order to permit high-resolution pointing and/or writing, is typically very thin and delicate, being particularly subject to damage in the event that the user subjects the touchpad to significant impacting contact by the stylus, which necessarily also has a fine point for operating the touchpad at high resolution.

It is known to use a conventional ball point pen cartridge as a stylus point, when it is desired to produce an inked record (such as on a paper strip temporarily covering the touchpad). When the cartridge is in good condition the rolling action of the ball avoids sliding contact wear of the membrane and/or the cartridge. However, when ink is not desired, an empty cartridge generally does not provide this advantage because the ball normally fails to roll. More importantly, the touchpads in use are still subject to excessive damage even when the stylus incorporates a ball pen cartridge.

Thus there is a need for a touchpad stylus that does not subject outer membranes of touchpads to excessive damage in normal use, and that otherwise overcomes the disadvantages of the prior art.

SUMMARY

The present invention meets this need by providing a stylus device that eliminates or greatly reduces the damage to the thin outer membranes of touch pads in normal use. It has been discovered that the bulk of damage to touchpads in use occurs at the initial impact of the stylus against the membrane. The stylus device of the present invention avoids this problem by limiting forces of impact when the stylus is brought into contact with the touchpad or similar device.

In one aspect of the invention, the stylus device includes an elongate stylus housing; a stylus body having a tip portion for contacting the touchpad device, the body being supported by the housing for axial movement along the longitudinal axis; a stop for limiting forward movement of the stylus body relative to the housing; and biasing means for forwardly biasing the body with a force being limited to a predetermined maximum axial bias over a predetermined minimum travel distance of rearward movement relative to a rest position of the stylus body, the minimum travel distance being not less than 0.025 inch, the maximum axial bias being not more than approximately 200 gm. Preferably the stylus body has a mass that is less than 10 percent of an aggregate mass of the stylus device for significantly limiting impact loading of the touchpad device upon initial contact by the stylus body. Preferably the mass of the stylus body is not greater than 0.5 gm.; more preferably the mass of the stylus body is not greater than only approximately 0.2 gm. Notwithstanding the above, the stylus body preferably has a mass that is less than only approximately 5 percent of an aggregate mass of the stylus device. As used herein, the term "stylus body" is inclusive of the above-recited tip portion and any rigid elements rigidly assembled therewith.

The biasing means can include a resilient cushion member interposed between a forwardly facing cavity surface of the housing and a rear extremity of the stylus body.

The rear extremity the stylus member can form an engagement surface having a progressively increasing cross-sectional engagement area over an axial distance not less than the minimum travel distance, the cushion member having a contact area facing the stylus member, the contact area being greater than a maximum of the engagement area. The engagement surface can include a face portion and a tapered portion, the face portion being generally planar and oriented approximately perpendicular to a longitudinal axis of the housing. The tapered portion of the engagement surface can be approximately conical. The face portion of the engagement surface can have an area that is approximately 25 percent of the maximum of the engagement area, and the contact area of the cushion member is preferably at least approximately 4 times the maximum of the engagement area for enhanced cushioning by the cushion member. Preferably the cushion member also has an axial depth that is not less than double the minimum travel distance. Further, the maximum of the engagement area is preferably not more than approximately 0.01 square inch.

Preferably the minimum travel distance of the stylus body relative to the housing is at least approximately 0.05 inch and the maximum axial bias is not more than approximately 100 gm.

The stop can include a resilient stop member interposed between a housing stop surface of the housing and a stylus stop surface of the stylus body. The stylus body can have a cylindrical stem portion, with the stylus stop surface forming a generally annular enlargement of the stylus body, and the housing stop surface also being generally annular and facing the stylus stop surface, the stylus body protruding through the stop member. The stop member can include a polymeric O-ring.

The stylus body can include a polymeric material that preferably has a frictional coefficient not greater than 0.2, as measured dry and with the material contacting steel. More preferably, the coefficient of friction is not more than approximately 0.1. The polymeric material of the stylus body can be an acetal resin. Preferably the tip portion of the stylus body forms a contact surface having a radius of curvature that is not less than 0.5 mm for limiting localized stress at locations of contact on the touchpad device. More preferably, the radius of curvature of the contact surface is at least approximately 1.0 mm.

The stylus device can be provided combination with the touchpad device, the touchpad device having an active surface and being responsive to force locally applied against the active surface, and further comprising a flexible sheet material removably covering the active surface to provide a replaceable writing surface to be contacted by the tip portion of the stylus. Preferably the flexible sheet material has a permanently applied adhesive coating for affixing the sheet material to the touchpad device.

DRAWINGS

These and other features, aspects, and advantages of the present invention will become better understood with reference to the following description, appended claims, and accompanying drawings, where:

FIG. 1 is a perspective view of touchpad stylus according to the present invention, the stylus being positioned against a touchpad for use therewith;

FIG. 2 is a lateral sectional view of the stylus of FIG. 1;

FIG. 3 is a detail sectional view within region 3 of FIG. 2;

FIG. 4 is a detail view of a stylus head portion appearing in FIG. 3;

FIG. 7 is a detail view as in FIG. 3, showing an alternative configuration of the stylus head portion.

DESCRIPTION

Figure 6:
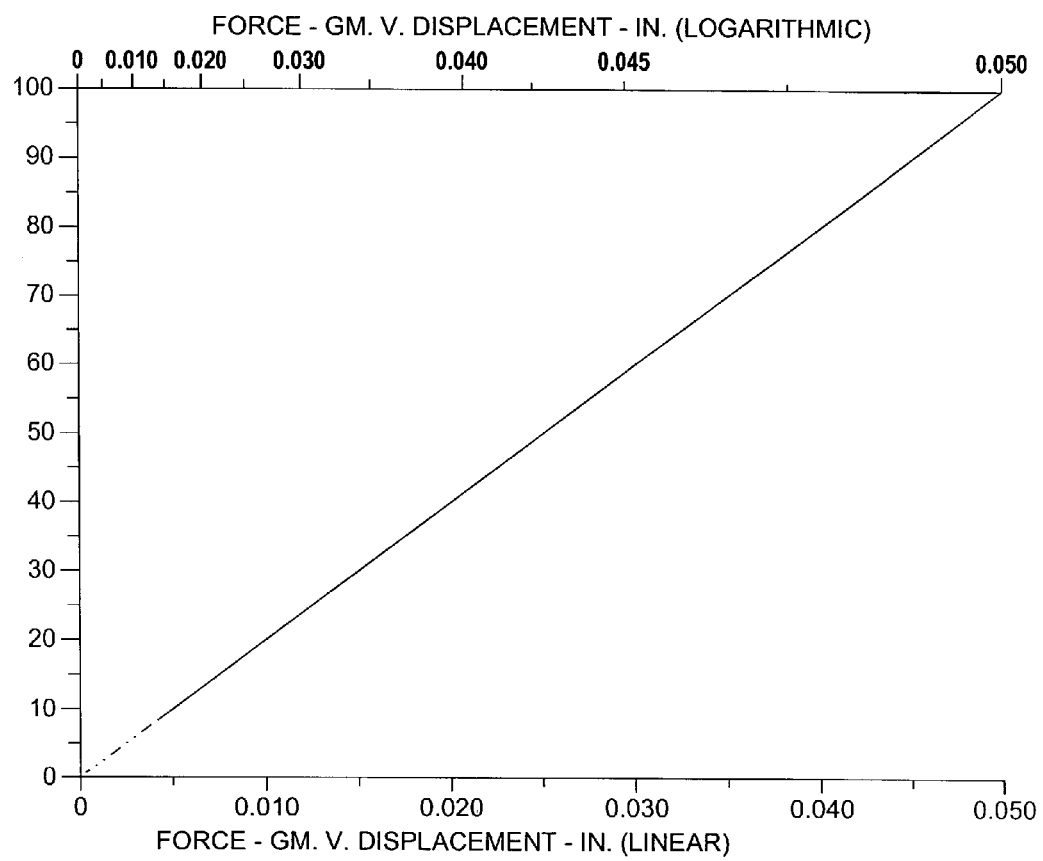
FIG. 6 is a graph of a progressively increasing biasing force of the stylus of FIG. 1 against rearward movement of a stylus member of the stylus relative to a housing thereof.

The present invention is directed to a stylus for use with touchpads and similar devices wherein a stylus point or tip is positioned and/or moved on a surface in electronic pointing operations or the production of graphical data. With reference to FIGS. 1–6 of the drawings, a touchpad stylus 10 includes a stylus housing 12 and a stylus member 14 having a tip extremity 16 that is adapted for contact with an outer membrane 18 of a touchpad 20, the membrane 18 covering a pad member 19. It will be understood that details of the touchpad 20 are outside the scope of the present invention, other than that typical touchpads include counterparts of the membrane 18, being a somewhat delicate member that is subject to damage when used with many styli of the prior art. As further shown in FIG. 1 and described below, the touchpad 20 can be provided with an optional thin replaceable sheet member 21 covering the outer membrane 18.

The stylus housing 12 has a rear or body portion 22 and a threadingly connected front or nose portion 24 which together form a conveniently hand-held device that is generally symmetrical about a longitudinal axis 25, the nose portion having a passage 26 formed therethrough for slidingly receiving a cylindrical stem or shank portion 28 of the stylus member 14 in concentric relation to the axis 25, the tip extremity 16 projecting forwardly of the nose portion 24. The stylus member 14 also has an enlarged head portion 30 that forms a forwardly facing stylus stop surface 32 extending outwardly from a rear extremity of the shank portion 28, the nose portion 24 of the housing 12 also having a rearwardly facing housing stop surface 34. A resilient O-ring 36 is supported on the shank portion 28 of the stylus member, being interposed between the stylus and housing stop surfaces 32 and 34 for cushioned limitation of forward travel of the stylus member 14 relative to the housing 12. The tip extremity 16 is formed having a smooth convex profile, a preferred profile being of spherical radius R. The radius R is sufficiently large to appropriately limit localized compressive stress and shear loading of the outer membrane 18 and/or the optional sheet member 21, while permitting a desired degree of visual access to portions of the touchpad 20 to which the tip extremity 16 is being applied. For this purpose, the radius R can be relatively small (0.3 mm for example); however, a larger value such as approximately 0.5 mm is preferred, an even greater radius of 1.0 mm being most preferred.

Preferably the stylus member 14 is formed of a material having relatively low density yet being sufficiently hard to retain its shape in normal use, the material also having a very low coefficient of friction with the outer membrane 18 of the touchpad 20 and/or the sheet member 21 optionally applied thereto for minimal wear of those materials. Further, the stylus member (or at least that portion including the tip extremity 16) is also formed of a material having high wear resistance for preserving a desired shape of the tip extremity 16. Commercially available materials particularly suited for use in the stylus member 14 include formulations of DELRIN® acetal resin that are available from a variety of sources. Of particular interest are Delrin 500, 550, and 507, having a coefficient of friction of between approximately 0.1 and 0.3, both static & dynamic as measured dry, on steel. Similarly, Delrin AF has a coefficient of friction between approximately 0.05 and 0.15, and Delrin 570X has a coefficient of friction of approximately 0.2. Another formulation *?* of Delrin acetal resin has a coefficient of friction of approximately 0.25 and a wear factor of 216, which compares favorably with an alternative material, nylon, having a friction coefficient of 0.35 and a wear factor of 72. Accordingly, it is preferred that the material of the stylus member be or include a polymer having a coefficient of friction not greater than 0.2, which is believed to be easily obtainable by selection from available stock. Further, a most preferred material for the stylus member 14 is Delrin AF, selected for having a friction coefficient of not greater than approximately 0.1.

The housing body portion 22 has a forwardly facing cushion cavity 38 formed therein for supporting a cushion member 40 that is contacted by an engagement surface 42 of the stylus member head portion 30. As shown in FIG. 3, an unloaded position of the stylus member 14 relative to the housing 12 is preferably characterized by substantially no axial clearance and no axial (compressive) loading of the head portion 30 and the O-ring 36 between the cushion member 40 and the housing stop surface 34, the cushion member 40 having a substantially planar front surface in its unloaded condition in the exemplary configuration of FIGS. 1–6. Suitable materials for the cushion member include low density silicon foam, a preferred such material being commercially available as No. 86235K42 EXOBLOC™ silicone foam from McMaster Carr of Los Angeles, Calif. Thus foam has a UL-94-HF-1V-0 rating, a density of from 9 to 19 pounds per cubic foot, and requires only approximately 2 to 3 psi for compression to 25 percent of a relaxed thickness. In the preferred exemplary configuration of the stylus 10, the cushion member 40 has a thickness of approximately 0.125 inch and an outside diameter of 0.200 inch, the cushion cavity 38 having the same dimensions.

The engagement surface 42 of the head portion 30 is also preferably configured for producing, in combination with the cushion member 40, a desired force-displacement profile of the stylus member 14. Toward that end, the engagement surface 42 has a first portion 42A that is preferably barely in contact with the cushion member 40 when the stylus member 14 is in its advanced, unloaded position shown in FIG. 3 (and by broken lines in FIG. 5), and a second portion 42B for contacting the cushion member when the stylus member is displaced rearwardly as shown by solid lines in FIG. 5. As shown In FIG. 6, preferred configurations of the touchpad stylus 10 provide for smoothly increasing axial displacement of the stylus member 14 of up to approximately 0.05 inches in response to axial loads ranging from approximately zero up to approximately 100 grams. In the illustrated exemplary configuration, the first portion 42A of the engagement surface is substantially planar, the second portion being generally frusto-conical for producing a mildly increasing force-displacement profile that smoothly becomes a more rapidly increasing profile as the stylus member 14 is displaced toward the retracted position shown by the solid lines in FIG. 5. This behavior is approximated by the upper logarithmic scale in FIG. 5. More particularly, and as shown in FIG. 4, the planar first portion 42A of the engagement surface 42 has a diameter D1, the second engagement surface portion 42B sloping outwardly and forwardly toward a diameter D2, the diameter D2 being coincidently an overall outside diameter of the stylus member head portion 30.

Figure 5:
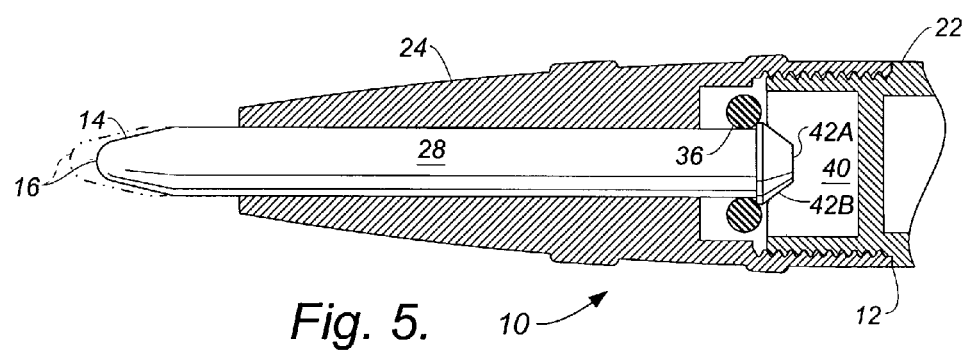
FIG. 5 is a sectional view as in FIG. 3, showing the stylus in a loaded condition.

In the preferred exemplary configuration, the head portion 30 of the stylus member 14 is formed with the diameter D1 of the first engagement surface portion being approximately 0.050 inch, the limiting diameter D2 of the second engagement surface portion being approximately 0.104 inch (the stylus stop surface 32 radially projecting approximately 0.010 outwardly from an approximate diameter of 0.094 inch of the stylus member shank portion 28. The limiting diameter D2 of the engagement surface second portion 42B is preferably located forwardly of the first portion 42A by a distance equal to or only slightly greater than the full axial travel distance of the stylus member 14 between the positions shown in FIGS. 3 and 5, as best shown in FIG. 5. Thus in this described configuration the engagement surface 42 contacts progressively increasing area portions of the cushion member 40 as the stylus member 14 is displaced rearwardly.

It will be appreciated that the stylus member 14 can be very low in mass as compared with an aggregate mass of the touchpad stylus 10. For example, approximating the volume of the stylus member as being equivalent to a diameter of 0.1 inch and a length of 1 inch, the material having a density of 1.6 relative to water, the approximate mass is only $$0.1**2(in)*1.0(in)*2.54(cm/in)**3*1.6*\Pi/4=0.2053 \text{ gm.}$$

This contrasts favorably with an estimated aggregate mass of at least about 4 gm for a complete stylus of sufficient size to be comfortably grasped and controlled by a user thereof, the mass ratio being approximately 20. It is contemplated that satisfactory operation of the touchpad stylus 10 is obtained with the mass of the stylus member being not greater than 0.5 gm, although the mass is preferably not greater than the approximately 0.2 gm of the above-described preferred example.

With further reference to FIG. 7, an alternative configuration of the stylus member head portion, designated 30' has a cylindrical counterpart of the engagement surface second portion, designated 42B', for producing a nearly linear force-displacement curve as approximated by the lower linear scale in FIG. 6. As shown in FIG. 7, the diameter D2 is only slightly greater than the diameter D!, the difference being due to a slight rounding of the engagement surface 42 at the outer margin of the first engagement surface portion 42A that is provided for preventing cutting of the pad member 40 when being deformed by the head portion 30.

As further shown in FIG. 1, the sheet member 21 that is optionally applied to the touchpad outer membrane 18 has a permanently applied adhesive coating 44, the coating 44 being formulated for securely affixing the sheet member 21 to the outer membrane 18 of the touchpad 20, yet permitting removal of the sheet member without damage to the membrane 18 and without leaving any significant portion of adhesive material on the membrane. A material suitable for use as the sheet member 21 and having the adhesive coating 44 is commercially available as WRITEWRIGHT™ from Fellowes of Itasca, Ill. This material also has a slightly textured writing surface opposite the adhesive coating 44 for facilitating marking thereof by a suitable writing instrument.

Although the present invention has been described in considerable detail with reference to certain preferred versions thereof, other versions are possible. For example, other shapes and sizes of the engagement surface 42 are contemplated as well as different formulations and geometry of the cushion member as variations of the configurations described above being within the ordinary skill in the art and providing, minimum stylus member travel distances of 0.025 inch or greater with the maximum axial bias not exceeding approximately 200 grams. Also, a coil compression spring or other type of spring member can be substituted for the cushion member 40, and the stylus member 18 can be provided with a rolling-ball at the tip extremity 16. Therefore, the spirit and scope of the appended claims should not necessarily be limited to the description of the preferred versions contained herein.

What is claimed is:

1. A stylus device for use with a touchpad device, the stylus device comprising:
   a. an elongate housing comprising a body portion and a nose portion, the nose portion having a longitudinal axis;
   b. a stylus element having a tip extremity for contacting the touchpad device, the stylus element being supported by the housing for axial movement along the longitudinal axis;
   c. a stop for limiting forward movement of the stylus element relative to the body portion; and
   d. biasing means for forwardly biasing the stylus element with a force limited to a predetermined maximum axial bias over a predetermined minimum travel distance of rearward movement relative to a rest position of the stylus element, the minimum travel distance being not less than 0.025 inch, the maximum axial bias being not more than approximately 200 gm.

2. The stylus device of claim 1, wherein the stylus element has a mass being less than 10 percent of an aggregate mass of the stylus device.

3. The stylus device of claim 2, wherein the mass of the stylus element is not greater than 0.5 gm.

4. The stylus device of claim 2, wherein the mass of the stylus element is not greater than approximately 0.2 gm.

5. The stylus device of claim 1, wherein the stylus element has a mass being less than approximately 5 percent of an aggregate mass of the stylus device.

6. The stylus device of claim 1, wherein the biasing means comprises a resilient cushion member interposed between a forwardly facing cavity surface of the housing and a rear extremity of the stylus element.

7. The stylus device of claim 6, wherein the rear extremity the stylus member forms an engagement surface having a progressively increasing crosssectional engagement area over an axial distance not less than the minimum travel distance, the cushion member having a contact area facing the stylus member, the contact area being greater than a maximum of the engagement area.

8. The stylus device of claim 7, wherein the engagement surface comprises a face portion and a tapered portion, the face portion being generally planar and oriented approximately perpendicular to the longitudinal axis.

9. The stylus device of claim 8, wherein the tapered portion of the engagement surface is approximately conical.

10. The stylus device of claim 8, wherein the face portion of the engagement surface has an area being approximately 25 percent of the maximum of the engagement area.

11. The stylus device of claim 7, wherein the contact area of the cushion member is at least approximately 4 times the maximum of the engagement area.

12. The stylus device of claim 11, wherein the cushion member has an axial depth being not less than double the minimum travel distance.

13. The stylus device of claim 11, wherein the maximum of the engagement area is not more than approximately 0.01 square inch.

14. The stylus device of claim 6, wherein the minimum travel distance is at least approximately 0.05 inch and the maximum axial bias is not more than approximately 100 gm.

15. The stylus device of claim 1, wherein the stop comprises a resilient stop member interposed between a housing stop surface of the housing and a stylus stop surface of the stylus element.

16. The stylus device of claim 15, wherein the stylus element has a cylindrical stem portion, the stylus stop surface forming a generally annular enlargement of the stylus element, the housing stop surface being generally annular and facing the stylus stop surface, the stop member being protruded by the stylus element.

17. The stylus device of claim 15, wherein the stop member comprises a polymeric O-ring.

18. The stylus device of claim 1, wherein the stylus element comprises a polymeric material having a frictional coefficient not greater than 0.2.

19. The stylus device of claim 18, wherein the frictional coefficient is not greater than approximately 0.1.

20. The stylus device of claim 18. wherein the stylus element comprises an acetal resin polymeric material.

21. The stylus device of claim 1, wherein the tip portion of the stylus element forms a contact surface having a radius of curvature being not less than 0.5 mm.

22. The stylus device of claim 21, wherein the radius of curvature of the contact surface is at least 1.0 mm.

23. The stylus device of claim 1, in combination with the touchpad device, the touchpad device having an active surface and being response to force locally applied against the active surface, and further comprising a flexible sheet material removably covering the active surface to provide a replaceable writing surface to be contacted by the tip portion of the stylus.

24. The stylus device of claim 23, wherein the flexible sheet material has a permanently applied adhesive coating for affixing the sheet material to the touchpad device.

25. A method of digitally recording an electronic signature comprising the steps of:
   a. providing a combination of the stylus of claim 1 and a touchpad, wherein the touchpad is adapted to receive and digitally record impressions made on the touchpad; and
   b. writing a signature on the touchpad with the stylus device.

26. The method of claim 25 wherein the touchpad comprises a flexible membrane.

27. A stylus device for use with a touchpad device, comprising:
   a. an elongate stylus housing having a longitudinal axis and a forwardly facing cushion cavity, and a rearwardly facing annular housing stop surface;
   b. a stylus member supported by the housing for axial movement along the longitudinal axis, the stylus member being formed of a polymeric material having a frictional coefficient not greater than 0.2, and comprising:
      i. a cylindrical stem portion;
      ii. a tip portion having a contact surface adapted for contacting the touchpad device, the contact surface having a radius of curvature not less than 0.5 mm;
      iii. a forwardly facing generally annular stylus stop surface; and
      iv. an engagement surface extending forwardly from a rear extremity the stylus member, the engagement surface having a cross-sectional engagement area progressively increasing to a maximum engagement area of not more than approximately 0.01 square inch over an axial distance of not less than a minimum travel distance of the stylus member;
   c. a resilient annular stop member interposed between the housing and stylus member stop surfaces for limiting forward movement of the stylus member relative to the body; and
   d. a resilient foam polymer cushion member in the cushion cavity and having a cushion surface contacting the engagement surface of the stylus member, the cushion surface having an area not less than approximately 4 times the maximum engagement area of the stylus member for forwardly biasing the body with a force being limited to not more than approximately 200 gm over the minimum travel distance of the stylus body, the minimum travel distance being not less than approximately 0.025 inch.

28. The stylus device of claim 27, wherein the engagement surface comprises a face portion and a tapered portion, the face portion being generally planar and oriented approximately perpendicular to the longitudinal axis, the face portion having an area of approximately 25 percent of the maximum engagement area.

29. The stylus device of claim 27, in combination with the touchpad device, the touchpad device having an active surface and being response to force locally applied against the active surface, and further comprising a flexible sheet material removably covering the active surface to provide a replaceable writing surface to be contacted by the tip portion of the stylus device.

* * * * *